INVENTOR.
Stanislav Jura
BY Richard Cook
Agt

TAPE WINDING CONTROL MECHANISM

Filed May 12, 1965 2 Sheets-Sheet 2

INVENTOR.
Stanislav Jura
BY
Richard Low
Agt 3,315,907

TAPE WINDING CONTROL MECHANISM

Stanislav Jura, Prague, Czechoslovakia, assignor to Výzkumný ústav matematických strojů, Prague, Czechoslovakia Filed May 12, 1965, Ser. No. 455,117
Claims priority, application Czechoslovakia, May 16, 1964, 2,833/64
5 Claims. (Cl. 242—55.12)

The present invention relates to reeling and winding, and more particularly to improved mechanism for controlling the winding, of magnetic recording tape used in data storage apparatus of information processing machines.

In such machines, the data storage apparatus usually involves supply reels or spools on which the tape is wound and/or from which the tape is unwound, controlled electric motors, clutch means for selectively driving the reels in either direction, capstan rollers, transducing means adjacent each reel and located between the reels, and a reservoir between the transducing means for storing tape with information thereon until the information is processed.

One of the disadvantages of such machines is that the motors and the clutch means which assure rapid reversibility of the rotation of the reels are energized by electric currents. Such currents create electro-magnetic fields which can be very detrimental to the correct functioning of the magnetic tape and can damage the data stored on the tape or have an injurious effect on the electronic logic circuits.

Accordingly, an object of the present invention is to overcome the foregoing difficulties by providing a winding control mechanism which does not require electrical energy in the vicinity of the tape.

Another object of my invention is to provide such mechanism which is simple and economical in construction, and rapid and reliable in operation.

A further object is to provide a mechanism which can be used in conjunction with various types of tape storage reservoirs.

Other objects will be apparent from the following description.

In accordance with the present invention, the foregoing objects are generally accomplished by apparatus wherein one or two reel drive clutches and a brake are pneumatically controlled by pneumatic sensing and regulating means which respond to the amount of tape stored in the reservoir, and the input to the drive clutches is provided by electric motors or air motors at a remote location with respect to the magnetic tape so as not to establish a harmfun electro-magnetic field in the vicinity of the tape.

The specification is accompanied by drawings in which.

Figure 1:
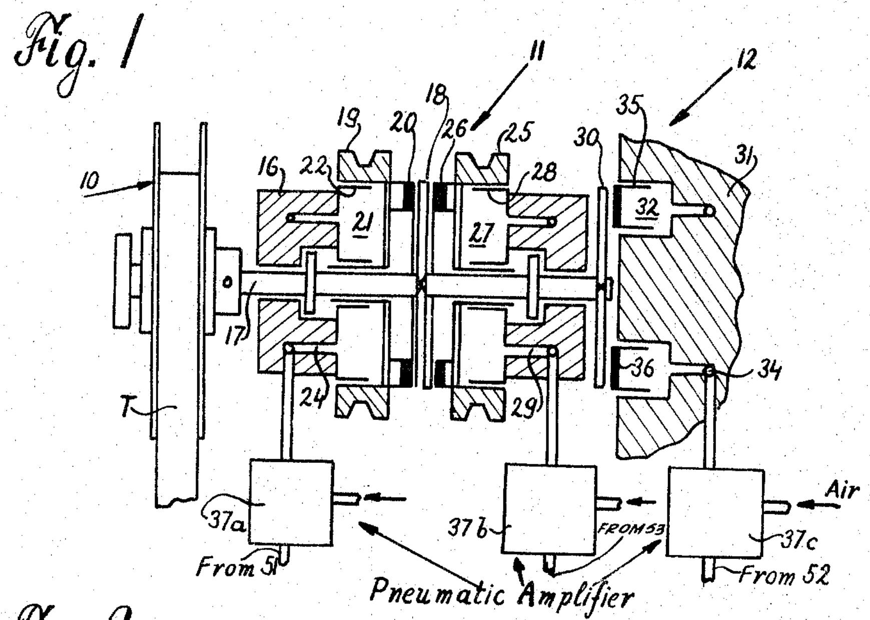
FIG. 1 is a schematic view, partly in section and partly in elevation, of a reel, a controlled drive, and a brake of a tape winding control mechanism embodying features of the invention.
Figure 2:
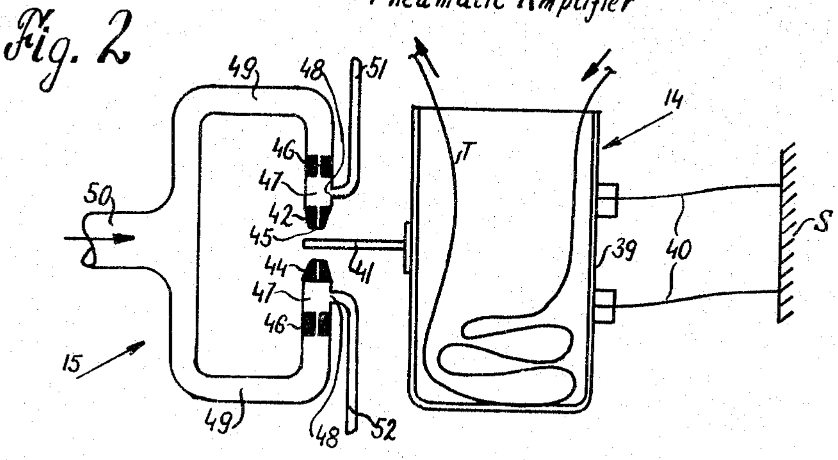
FIG. 2 is a schematic view of one form of tape storage reservoir and one form of an arrangement for sensing the amount of tape stored and controlling a single drive clutch and the brake.

Referring now to the drawings in greater detail, and initially to FIGS. 1 and 2, apparatus is shown which generally comprises a take-up and or supply reel 10 for magnetic tape T, a drive 11 for the reel, a brake 12 for the drive, a tape storage reservoir 14, constructed and arranged to sense and respond to the amount of tape stored therein, and pneumatic regulating means 15 under the control of the reservoir for controlling the drive and the brake.

The drive 11 shown in FIG. 1 comprises a housing 16, a shaft 17 journalled for rotation in the housing and having the reel secured thereto at one end for rotation therewith, a clutch friction disc 18 secured to the shaft between the ends thereof for rotation therewith, a first clutch member 19 rotatable about and slidable with respect to the shaft serving as a pulley and having a surface 20 for frictionally engaging one side of the clutch disc to provide a driving connection between the disc and the clutch member and having an annular chamber 21 therein for air under pressure admitted thereto by a ring 22 fitted in the chamber 21 and admitted by conduit means 24 from pneumatic amplifier **37*a*. The surface 26 which frictionally engages the other side of the clutch disc 18 is connected to a second rotary clutch member 25 serving as a pulley which rotates in a direction opposite to the first clutch member 19, this clutch member 25 being formed with annular chamber 27 for air under pressure admitted thereto by a ring 28 fitted in the chamber 27 and admitted by conduit means 29 from a pneumatic amplifier 37*b*. The brake 12 for the drive includes a stationary braking member 31 formed with the annular chamber 32 and receiving air under pressure by way of the conduit means 34 from the pneumatic amplifier 37*c*. A second disc 30 is fixed to the shaft 17, and a ring 35 is provided, fitted in the chamber 32 and having a surface 36 for engaging the brake disc 30 to apply a braking force thereon to retain and stop the rotation of the shaft 17**.

Air under pressure is supplied respectively to the conduit means 24, 29 and 34 by pneumatic pressure amplifiers **37*a*, 37*b* and 37*c***. Such amplifiers or relays are well known and need not be illustrated in detail. Essentially, such devices include a pilot valve which responds to low air pressure and controls the supply of pressure to a piston operated valve for controlling the flow of air at a higher pressure.

In FIG. 2, a reservoir 14 is shown which is of the bin type wherein tape T is placed and withdrawn as indicated by the arrows. This reservoir includes a bin 39, springs 40 for mounting the bin to fixed structure S so that the bin changes position in response to the weight of the tape in the bin, and a control member such as a flap 41 on the bin for cooperating with the regulating means 15 as about to be described.

The regulating means 15 shown in FIG. 2 is constructed and arranged for controlling one of the clutch members, for example, the clutch member 19, and the brake 12. This regulating means comprises a pair of vertical opposed nozzles 42 and 44 each having a restricted discharge outlet 45 and a restricted inlet 46 providing a pressure chamber 47 between the inlet and outlet formed with a bypass outlet 48, and a pipe 49 for supplying air under pressure to the chamber 47 from a common source 50. The pressure chamber of the nozzle 42 is connected to the amplifier **37*a* by a conduit 51, and the pressure chamber of the nozzle 44 is connected to the amplifier 37*c* by a conduit 52**.

The control member 41 is positioned between the discharge outlets of the nozzles 42 and 44 to control the flow the air through the conduits 51 and 52 and is movable with the tape storage bin 39 to alternately open and close the discharge outlets of the nozzles 42 and 44 so that air under pressure flows from the conduit of the closed nozzle to its pressure amplifier whereby the clutch member 19 and the brake member 35 are operated alternately in a manner to apply the brake when the bin is heavy and to operate the tape supply reel when the bin is light which in this case would be the reel shown in FIG. 1.

While not shown, a similar arrangement may be provided for operating another reel which takes up the tape and lets off the tape while the reel shown respectively lets off the tape and takes up the tape. Also, a plurality of storage reservoirs equipped with let-off and take-up reels controlled in the manner as described herein may be provided between the transducing means for applying the information onto the tape and the transducing means for analyzing the information on the tape. Likewise, analyzing transducers may be located between adjacent reservoirs for channeling various types of information into different recording apparatus.

Figure 3:
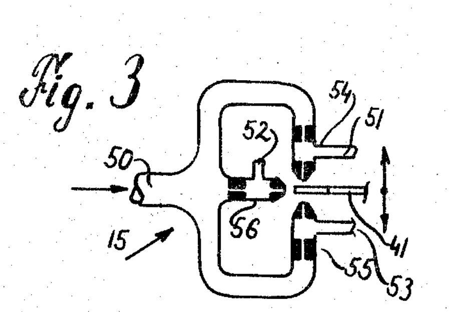
FIGS. 3 and 4 are schematic views of arrangements for controlling two drive clutches and a brake.
Figure 4:
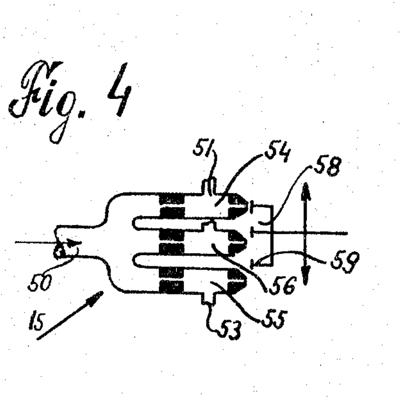

Referring now to FIG. 3 and FIG. 4, arrangements 15 are shown for controlling the brake 12 and both clutch members 19 and 25 so that the reel 10 shown in FIG. 1 can be selectively stopped or rotated in either direction. Thus, where only one direction of rotation for the reel 10 is required, the structure shown between the discs 18 and 30 in FIG. 1 may be omitted, while this latter structure is included when rotation of the reel 10 in opposed directions is provided.

The arrangement shown in FIG. 3 comprises two opposed clutch regulating nozzles 54 and 55 and a brake regulating nozzle 56 vertically disposed between the nozzles 54 and 55. These nozzles are constructed in the same manner as the nozzle described with reference to FIG. 2.

The pressure chamber of the nozzle 54 is connected to the amplifier **37*a* by the conduit 51, the pressure chamber of the nozzle 55 is connected to the amplifier 37*b* by a conduit 53 and the pressure chamber of the nozzle 56 is connected to the amplifier 37*c* by the conduit 52. The flap member 41 is positioned between the opposed nozzles 54 and 55 with opposite sides of the flap members facing one of these nozzles to control the opening and closing thereof and with the free end of the flap member extending across the discharge outlet of the nozzle 56** to close the same when the flap member is in an intermediate or neutral position as shown.

In this manner, the reel is rotated in one direction when the flap member 41 closes the nozzle 54, and is rotated in the opposite direction when the flap member closes the nozzle 55. When the flap member closes the nozzle 56, the clutches are ineffective and the brake is applied to stop rotation of the reel.

In FIG. 4, an arrangement is shown which is similar to that shown in FIG. 3 except for some minor changes. In FIG. 4, the nozzles 54, 55 and 56 are disposed side by side with the brake regulating nozzle 56 between the clutch regulating nozzles 54 and 55. The control member 41 has three nozzle closing portions 57, 58 and 59 which are spaced so that the nozzles 55 and 56 are open when the nozzle 54 is closed as shown, the nozzles 54 and 56 are open when the nozzle 55 is closed, and the nozzles 54 and 55 are open when the nozzle 56 is closed.

Figure 5:
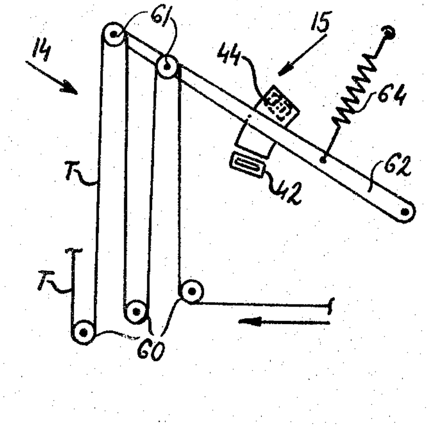
FIG. 5 is a schematic view of another form of tape storage reservoir and another form of an arrangement for controlling two drive clutches and a brake.

In FIG. 5, a reservoir 14 is shown which is in the form of an accumulator. This reservoir comprises fixed lower pulleys 60 and upper pulleys 61 on a pivotally mounted arm 62 which is restrained by a tension spring 64. The tape T is strung in zig-zag loops over the lower and upper pulleys and runs in the direction indicated by the arrow.

Pressure regulating means 15 are provided for controlling the clutch and the brake in a manner similar to that of the arrangement shown in FIG. 2. The arrangement shown in FIG. 5 comprises a clutch regulating nozzle 42 and a brake regulating nozzle 44 spaced along the arc of a circle; and a control member 41 in the form of a plate which is mounted on the arm 62 for selectively opening and closing the discharge outlets of the nozzles.

In the position shown the reservoir is filled to its capacity and the brake is effective and the clutch is ineffective. When there is a demand for tape, the tension of the tape increases and the loops are shortened to pull down the arm 62. As this happens, the brake is rendered ineffective and the clutch is rendered effective to drive the reel in a direction to supply more tape. When demand for tape decreases the loops are lengthened and the arm is raised to render the brake effective and the clutch ineffective.

Figure 6:
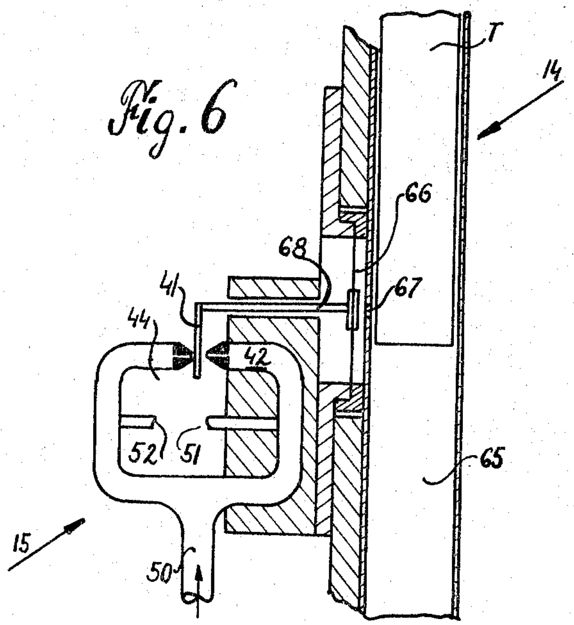
FIG. 6 is a fragmentary sectional view of still another form of tape storage reservoir and another form of an arrangement for controlling a single drive clutch and a brake.

In FIG. 6, a vacuum column type reservoir 14 for the tape T is shown which comprises a chamber 65 wherein a vacuum is maintained, a diaphragm 66 responsive to the vacuum through an orifice 67, and a control member 41 such as a flap connected to the diaphragm by a rod 68 and disposed between nozzles 42 and 44 of regulating means 15 as shown in and described in connection with FIG. 2 for controlling a clutch and a brake.

When the reservoir is filled to its desired capacity, the tape T obstructs the orifice 67 as shown and the diaphragm 66 moves outwardly of the chamber to cause the flap 41 to close the nozzle 44 and open the nozzle 42, whereupon the brake is rendered effective and the clutch is rendered ineffective and the feeding of tape to the reservoir ceases. As tape is withdrawn from the reservoir and the orifice is unobstructed, the vacuum in the chamber pulls the diaphragm inwardly to cause the flap to close the nozzle 42 and to open the nozzle 44, whereupon the brake is rendered ineffective and the clutch is rendered effective to drive the reel in a direction to supply tape to the reservoir.

From the foregoing description, it will be seen that the present invention provides an improved winding control mechanism for magnetic tape or other winding operations where electrical current in proximity to the material may be hazardous or detrimental.

It will be apparent that while I have shown and described my invention in a few forms only, many changes and modifications may be made without departing from the spirit of the invention defined in the following claims.

I claim:

1. In winding apparatus of the class described, the combination of a shaft mounted for rotation, a reel for tape on said shaft and rotatable therewith, a clutch friction disc and a brake friction disc on said shaft and rotatable therewith, rotatable drive means having a pneumatic pressure operated member for frictionally engaging one side of said clutch disc to effect rotation of said shaft, brake means including a pneumatic pressure operated member for frictionally engaging said brake disc to retard rotation of said shaft, a reservoir for storing tape including means constructed and arranged to sense and respond to the amount of tape stored in said reservoir, and pneumatic regulating means including first and second nozzles, each having a discharge outlet, an air inlet and a bypass outlet between said discharge outlet and said air inlet and connected for each respectively controlling one of said pressure operated members and including a control member operatively connected to said storage response means and facing said nozzle discharge outlets, said control member being constructed and arranged for closing one of said discharge outlets and opening the other of said discharge outlets and vice versa.

2. In apparatus according to claim 1, wherein said storage responsive means is constructed and arranged to respond to the weight of the tape stored in said reservoir.

3. In apparatus according to claim 1, wherein said storage responsive means is constructed and arranged to respond to the tension of the tape stored in said reservoir.

4. In apparatus according to claim 1, wherein said storage responsive means is constructed and arranged to respond to the position of the tape stored in said reservoir.

5. In apparatus according to claim 1, including a second rotatable drive means having a pneumatic pressure operated member for frictionally engaging the other side of said clutch disc and rotated to effect rotation of said shaft in the opposite direction, said shaft is rotated by said first mentioned drive means; and wherein said pneumatic regulating means includes a third nozzle having a discharge outlet, an air inlet and a bypass outlet between said discharge outlet and said air inlet and connected for controlling said pressure operated member of said second drive means, and wherein said control member is constructed and arranged alternately opening and closing said first and third nozzles to control the direction of rotation of said shaft and to simultaneously open said first and third nozzle while closing said second nozzle to render said brake means effective and said first and second drive means ineffective.

References Cited by the Examiner

UNITED STATES PATENTS

| | | | |
|---|---|---|---|
| 3,143,312 | 8/1964 | Harper | 242—55.12 |
| 3,163,373 | 12/1964 | Darwin et al. | 242—55.12 |

STANLEY N. GILREATH, *Primary Examiner*.

LEONARD D. CHRISTIAN, *Examiner*.